Patented July 7, 1953

2,644,821

UNITED STATES PATENT OFFICE 2,644,821

ANTHRAPYRIDONE DYESTUFFS

Albin Peter and Jacques Günthart, Basel, Switzerland, assignors to Sandoz A. G., Basel, Switzerland, a Swiss firm No Drawing. Application June 28, 1951, Serial No. 234,139. In Switzerland June 30, 1950

6 Claims. (Cl. 260—278)

The present invention relates to new valuable dyestuffs of the anthrapyridone series.

A primary object of the present invention is the embodiment of a new group of anthrapyridone dyestuffs characterized by superior fastness properties, particularly with respect to fastness to light and fastness to fulling.

This object, as well as other objects which will hereinafter appear, is realized by the present invention, according to which an anthraquinone compound which corresponds to the formula

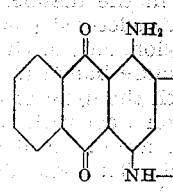

wherein X stands for phenyl or alkylphenyl, and Y stands for phenyl or tetrahydronaphthyl, either of which may carry any desired substituent or substituents other than solubilizing groups, such as sulfonic acid or carboxylic acid groups, is heated with a benzoylacetic acid ester, whereby conversion of the starting compound into the corresponding C-benzoyl-anthrapyridone takes place, whereafter the thus-obtained dyestuff base is treated with a sulfonating agent.

The new dyestuffs thus produced correspond to the structure

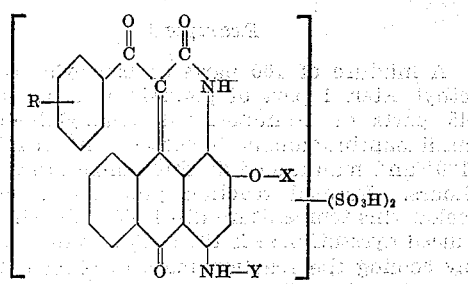

wherein R represents hydrogen, methyl, Cl, Br, methoxy or nitro, and X and Y have the previously given significances.

Preferred starting anthraquinones for the production of the new dyestuffs of the present invention are the 1-amino-4-arylamino-2-aryloxyanthraquinones wherein the aryloxy group or the aryl group or both may be substituted. Illustrative of these starting materials are:

1 - amino - 4 - phenylamino - 2 - p - tert. - butylphenoxyanthraquinone,
1 - amino - 4 - phenylamino - 2 - p - tert. - amylphenoxyanthraquinone,
1 - amino - 4 - phenylamino - 2 - m - ethylphenoxyanthraquinone,
1 - amino - 4 - phenylamino - 2 - p - cresoxyanthraquinone,
1 - amino - 4 - phenylamino - 2 - p - tert. - octylphenoxyanthraquinone,
1 - amino - 4 - phenylamino - 2 - p - cyclohexylphenoxyanthraquinone,
1 - amino - 4 - phenylamino - 2 - m - cresoxyanthraquinone,
1 - amino - 4 - p - toluidino - 2 - p - tert. - amylphenoxyanthraquinone,
1 - amino - 4 - p - toluidino - 2 - p - sec. - amylphenoxyanthraquinone,
1 - amino - 4 - mesidino - 2 - p - tert. - amylphenoxyanthraquinone,
1 - amino - 4 - phenyl - anilido - 2 - phenoxyanthraquinone,
1 - amino - 4 - p - phenoxy - anilido - 2 - p - cresoxyanthraquinone,
1 - amino - 4 - m - chloranilido - 2 - p - tert. - octylphenoxyanthraquinone,
1 - amino - 4 - m - xylidino - 2 - p - tert. - butylphenoxyanthraquinone, etc.

The expression "a benzoylacetic acid ester" is intended to cover the esters of benzoylacetic acid with lower alcohols—thus, for example, the benzoylacetic acid methyl ester and the benzoylacetic acid ethyl ester—and also derivatives thereof such as the o-nitro-, m-nitro-, p-nitro-, p-methyl-, p-nitro-methyl-, o-chloro-, m-chloro-, p-chloro-, and p-methoxy-benzoyl-acetic acid methyl and ethyl esters.

The condensation of the starting materials may take place in the benzoylacetic acid ester itself as the solvent, or in an extraneous solvent which does not participate in the reaction, such for example as o-dichloro-benzene, nitrobenzene, phenol, etc. Approximately two moles of benzoylacetic acid ester are employed per mole of aminoanthraquinone; preferably a slight excess (5 to 10%) is used. The addition of a small quantity of a weakly alkaline condensing agent, such as sodium carbonate, potassium acetate, etc., speeds up the reaction in many cases. The requisite temperature lies between about 130° and about 180° C.; the condensation generally proceeds especially smoothly to completion in several hours at 160–165° C., particularly if the volatile reaction products are continuously removed from the reaction zone with the aid of a gentle stream of gas. The resultant benzoylpyridone is isolated as a red crystalline product by diluting the reaction mixture with alcohol, filtering off the separated material with the aid of a suction filter, washing the collected solid with alcohol and water, and drying.

To convert the thus-obtained dyestuff base into a wool dyestuff, the former is treated with a sulfonating agent. To this end, the base is suspended either in an organic solvent, such as chlorobenzene, nitrobenzene, etc., and treated with chlorosulfonic acid at a moderate elevated temperature until the desired water-solubility is achieved, or it is dissolved in sulfuric acid monohydrate and stirred at a moderate temperature (approximately 0° to 50° C.), if necessary with addition of some weak oleum. The sulfonated products are isolated in suitable manner, for example by pouring into water, salting out, filtering and washing the collected solid.

The thus-obtained dyestuffs dye wool and other animal fibers, such as silk, tussah, etc., as well as polyamides, such as nylon, in vivid yellowish-red to bluish-red shades. The dyeings on wool are distinguished by their fastness to fulling and fastness to light.

The following examples set forth representative exemplary embodiments of the invention, and these examples are intended to be solely illustrative and not at all limitative. In these examples, the parts are by weight and the temperatures in degrees centigrade.

*Example 1*

A mixture of 50 parts of nitrobenzene, 30 parts of benzoylacetic acid ethyl ester, 45 parts of 1-amino - 2-p-tert.-amylphenoxy-4-anilidoanthraquinone and 1 part of sodium carbonate is heated to 130° with stirring. The readily volatile reaction products are removed with the aid of a gentle current of air. The initially dark-violet melt gradually changes its color toward red. The condensation is complete when a test specimen, boiled in o-dichlorobenzene, does not become any redder, and a similar test specimen is insoluble in alcohol so that the latter is not colored bluish-violet thereby. The reaction takes about 24 hours. The reaction mixture is allowed to cool to 80°, whereupon it is diluted with 100 parts of isopropyl alcohol, cooled further to 20° and filtered. The thus-isolated base, C-benzoyl-2-p-tert.-amylphenoxy-4 - anilidoanthrapyridone, is then washed with water and dried. It is obtained in the form of shiny crystals and dissolves in high-boiling solvents, such as nitrobenzene, trichlorobenzene and o-dichlorobenzene, and also in concentrated sulfuric acid, with red coloration.

10 parts of the said base are dissolved in 40 parts of sulfuric acid monohydrate, and then 12 parts of oleum of 27% strength added gradually. After stirring for four hours, a test specimen dissolves in water without residue; if necessary, additional oleum is added until complete water-solubility is achieved. The sulfonated product is then poured into 400 parts of an ice-water mixture, to which 40 parts of common salt (sodium chloride) have been added, the precipitated dyestuff filtered off and washed to neutrality with dilute sodium chloride solution. The dried dyestuff is a reddish-violet powder. It dyes wool in vivid red shades of excellent fastness to fulling and to light, and corresponds to the formula

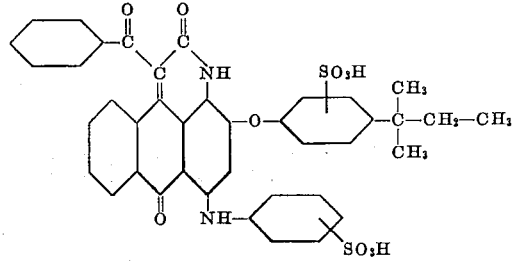

*Example 2*

A mixture of 50 parts of p-cresol, 40 parts of benzoylacetic acid ethyl ester, 46 parts of 1-amino-2-p - tert. - amylphenoxy-4 - p-toluidoanthraquinone and 1 part of sodium acetate is stirred thoroughly at 170°, the readily volatile products of the resultant reaction being continuously removed by means of a current of nitrogen. When there is no change in successive test specimens in nitrobenzene, the reaction mixture is allowed to cool, whereupon it is diluted with methyl alcohol and the precipitated base separated by suction filtration. The thus-obtained base dissolves in sulfuric acid with bluish-red coloration.

10 parts of the said base are introduced at 10° into 50 parts of oleum of 7–8% strength, and the mixture stirred at 10–15° until a test specimen dissolves completely in hot dilute aqueous sodium carbonate solution. The thus-produced dyestuff is worked up in the manner described in Example 1. It is a violet-red powder and dyes wool, silk, tussah, nylon, etc., in vivid red shades, which are slightly more bluish than the shades of dyeings made with the dyestuff of Example 1. The dyeings made on wool with the dyestuff of the present example are of excellent fastness to fulling and to light. The said dyestuff corresponds to the formula

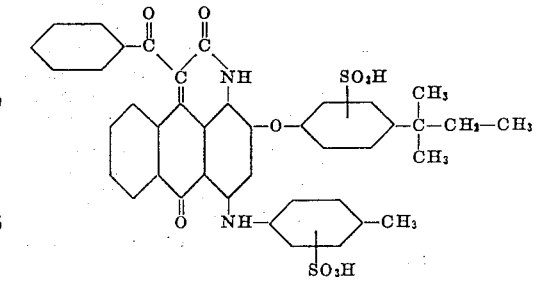

*Example 3*

A mixture of 100 parts of benzoylacetic acid ethyl ester, 1 part of potassium carbonate and 45 parts of 1-amino-2-p-tert.-amylphenoxy-4-anilidoanthraquinone is heated, with stirring, to 180° and maintained at this temperature for 12 hours. Formed reaction products which boil below this temperature distil off. The thus-produced dyestuff base is then allowed to crystallize by cooling the reaction mass to room temperature (20–30°). If desired, the base may be precipitated by dilution with alcohol. In either case, the base is then filtered off, washed with alcohol and water, and dried. Sulfonation of the base is then carried out after the manner described in Example 1. The resultant dyestuff is identical with that of Example 1.

Example 4

55 parts of 1-amino-2-p-tert.-butylphenoxy-4-anilidoanthraquinone are heated to 160–165° with 50 parts of benzoylacetic acid methyl ester, 75 parts of nitrobenzene and 1.5 parts of sodium carbonate, the mixture being maintained at this temperature, with stirring, for 6 hours, readily volatile products of the reaction which ensues being allowed to distill off. The mixture is then cooled to 80°, diluted with 120 parts of alcohol, and the precipitated base isolated, after the manner described in the preceding examples. There is thus obtained the C-benzoyl-2-p-tert.-butylphenoxy-4-anilidoanthrapyridone in the form of fine orange-red needles, which dissolve in concentrated sulfuric acid with pure red coloration.

10 parts of this base are introduced into 45 parts of sulfuric acid monohydrate at a temperature below 15°, 12 parts of oleum of 28% strength being added in the course of 4 hours. Stirring is then continued until a test specimen is completely soluble in water. If necessary, auxiliary amounts of oleum may be added in order to achieve this result. The thus-produced sulfonation product is poured into a 10% aqueous sodium chloride solution, and the precipitated dyestuff filtered off and washed to neutrality with sodium chloride solution. After drying, the dyestuff is a violet-red powder which dyes wool in vivid red shades which are fast to fulling and to light and which correspond to the formula

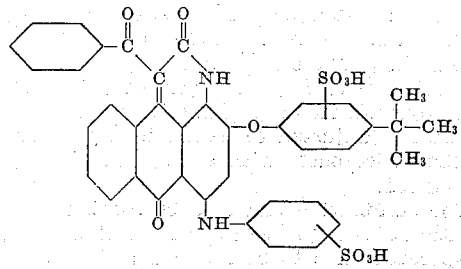

Example 5

45 parts of 1-amino-2-p-tert.-amylphenoxy-4-anilidoanthraquinone are stirred into 60 parts of o-dichlorobenzene, and 1 part of sodium carbonate and 38 parts of benzoylacetic acid ethyl ester are added. The mixture is heated to 160–165°, the condensation being run to completion in the manner described in the preceding examples. After dilution of the reaction mixture with methyl alcohol, filtering off the product, and washing and drying the latter, there is obtained the base described in Example 1.

10 parts of this base are introduced into 40 parts of chlorobenzene, the mixture warmed to 40°, and 12 parts of chlorosulfonic acid added at 40–50°. Stirring is continued for 3 hours at 45–50°, and the chlorobenzene removed with the aid of steam. To the resultant aqueous suspension of the dyestuff, sufficient sodium chloride is added to assure complete precipitation of the dyestuff which is then filtered off, washed neutral and dried. The dyestuff is obtained as a bright red powder and dyes wool, silk and tussah in vivid red shades. The dyeings on wool are of excellent fastness to fulling and to light.

Example 6

A mixture of 50 parts of nitrobenzene, 50 parts of 1-amino-2-p-iso-octylphenoxy-4-p-toluidoanthraquinone, 1 part of sodium carbonate and 38 parts of benzoylacetic acid ethyl ester is heated to 165°, and stirring continued at this temperature for 6 hours, while distilling off lower boiling fractions formed as a result of the reaction which takes place. The resultant dyestuff base is recovered from the reaction mixture in the manner described in the preceding examples. It takes the form of uniform red crystals and dissolves in organic solvents, such as trichlorobenzene, and in concentrated sulfuric acid with bluish red coloration.

10 parts of the said base are introduced, at a temperature below 15°, into a mixture of 45 parts of sulfuric acid monohydrate and 12 parts of oleum of 28% strength. After stirring for three hours, a test specimen will be soluble in water without residue; if necessary in order to achieve complete solubility, a little more oleum may be added. The resultant sulfonation product is poured into a mixture of 400 parts of water and ice and 25 parts of sodium chloride. The precipitated dyestuff is filtered off with suction, washed neutral, and dried. It dyes wool in a bluish red shade which is fast to fulling and to light.

A more yellowish dyestuff is obtained if, in this example, the 50 parts of 1-amino-2-p-iso-octylphenoxy-4-p-toluidoanthraquinone are replaced by 46 parts of 1-amino-2-p-tert.-amylphenoxy-4-o-toluidoanthraquinone, the condensation and sulfonation being otherwise carried out as described in the example. This dyestuff gives dyeings also of good fastness to fulling and to light.

Example 7

A mixture of 43 parts of nitrobenzene, 30 parts of benzoylacetic acid methyl ester, 0.8 part of potassium carbonate and 35 parts of 1-amino-2-p-tert.-butylphenoxy-4-m-toluidoanthraquinone is stirred for five hours at 165°, the volatile products of the resultant reaction being removed with the aid of a gentle stream of gas. The reaction mixture is then cooled to 100° and diluted with 80 parts of isopropyl alcohol. Stirring is continued for a while at room temperature, whereupon the separated dyestuff base is filtered off, washed with isopropyl alcohol and water, and dried. A very good yield of base is obtained in the form of orange-red crystals which dissolve in trichlorobenzene, and also in concentrated sulfuric acid, with vivid red coloration.

10 parts of the said base are dissolved, at a temperature below 15°, in 40 parts of sulfuric acid monohydrate, and 12 parts of oleum are then added in uniform manner over a period of four hours at 10–15°, after which stirring is continued for an additional hour. A test specimen will then be completely soluble in water. The thus-formed dyestuff is isolated after the manner described in the preceding examples. It dyes wool a vivid red of excellent wet fastness properties and of very good fastness to light.

A dyestuff of very similar properties is obtained if, in this example, the 1-amino-2-p-tert.-amylphenoxy-4-m-toluidonanthraquinone is replaced by an equivalent quantity of 1-amino-2-p-tert.-butylphenoxy - 4 - m - toluidoanthraquinone, and otherwise proceeding as described in the example.

It is also possible to start with a corresponding quantity of 1-amino-2-p-tert.-amylphenoxy-4-m-chloranilidoanthraquinone, the condensation and sulfonation being carried out as precedingly described. The thus-obtained dyestuff produces dyeings on wool which are a more yellowish red than these of the m-toluidine dyestuff, but which exhibit a like fastness to fulling and to light.

Example 8

60 parts of nitrobenzene, 41 parts of benzoylacetic acid ethyl ester, 1 part of sodium carbonate and 52 parts of 1-amino-2-p-tert.-amylphenoxy-4 - mesidinoanthraquinone are admixed and heated to 160°. The mixture is kept at this temperature for 10 hours, the readily volatile products of the ensuing reaction being distilled off. The reaction mixture is then cooled to 80°, diluted with 120 parts of methyl alcohol, and stirred for a further hour. The resultant base is isolated in the form of dark orange crystals.

10 parts of this base are dissolved in 40 parts of sulfuric acid monohydrate at 10–12°, and 13 parts of oleum of 26% strength then added in the course of 5 hours. Stirring is continued for 2 more hours at 15°, the sulfonation being then discontinued if a test specimen is clearly soluble in water. A further small quantity of oleum is added if necessary. The sulfonation mixture is then poured into a mixture of 200 parts of ice, 300 parts of ice-cold water and 50 parts of sodium chloride, and the resultant precipitate separated by suction filtration. The thus-isolated precipitate is suspended in aqueous sodium chloride solution of 10% strength, adjusted to neutrality with the aid of sodium carbonate, separated by suction filtration, and dried. The dyestuff, thus obtained, is an orange-red powder. It dyes animal fibers a very vivid yellowish-red; its dyeings on wool are of excellent fastness to fulling and good fastness to light.

A yellowish-red dyestuff of similar properties is obtained when, in this example, the 52 parts of 1 - amino - 2 - p - tert. - amylphenoxy - 4-mesidinoanthraquinone are replaced by 49 parts of 1 - amino - 2 - p - tert. - butylphenoxy - 4-vic. - m - xylidinoanthraquinone, while otherwise following the preceding prescriptions as to condensation and sulfonation.

Example 9

A mixture of 55 parts of benzoylacetic acid ethyl ester, 1.5 parts of sodium carbonate, 60 parts of 1-amino-2-p-cresoxy-4-p-chloranilidoanthraquinone and 70 parts of p - tert. - amylphenol is stirred at 170° until the distillation of the produced readily volatile products ceases and a test specimen in nitrobenzene is no longer redder than a preceding test specimen. The reaction mixture is then cooled to 120° and diluted with 150 parts of isopropyl alcohol. The beautifully crystallized base which forms is filtered off, washed with isopropyl alcohol, and dried. It dissolves in nitrobenzene, trichlorobenzene and also in concentrated sulfuric acid with vivid red coloration.

10 parts of the said base are dissolved in 40 parts of sulfuric acid monohydrate, whereupon 10 parts of oleum of 28% strength are run in at 5–10° within a period of 15 minutes. Stirring is continued at the last-mentioned temperature until a test specimen is completely water-soluble, which should take about 8–10 hours. The thus-produced dyestuff is isolated after the manner described in the preceding examples. It dyes wool a bluish red of excellent fastness to fulling and to light.

By replacing the 60 parts of 1 - amino - 2-p-cresoxy-4-p-chloranilidoanthraquinone in this example by 62 parts of 1-amino-2-p-tert.-amylphenoxy - 4 - p - chloranilidoanthraquinone, and otherwise proceeding according to the prescriptions of the example, there is obtained a somewhat more yellowish dyestuff of equally good fastness to fulling and to light.

Example 10

22 parts of 1-amino-2-p-tert.-amylphenoxy-4-p-phenoxy-anilidoanthraquinone and 0.5 part of potassium carbonate are stirred into 30 parts of nitrobenzene and 16 parts of benzoylacetic acid methyl ester. While removing the resultant lower boiling reaction products with the aid of a gentle stream of nitrogen, the mixture is heated to 165° for 5 hours. It is then cooled, diluted with alcohol, and the precipitated base filtered off, washed with alcohol, then with water, and dried.

10 parts of the thus-prepared base is introduced into 40 parts of sulfuric acid monohydrate and the mixture stirred at 45–50° until a test specimen is completely water-soluble. The mixture is then poured into an aqueous sodium chloride solution of 10% strength, and the precipitated dyestuff isolated by suction filtration. The dyestuff is adjusted to neutrality by trituration of the moist paste with sodium carbonate, and then dried.

The sulfonation can also be carried out with addition of 5–10 parts of oleum; in this event, the temperature has to be reduced to 10–15°.

The dyestuff thus obtained dyes animal fibers in red-violet shades. The dyeing on wool is of excellent fastness to fulling and to light.

A red-violet dye of very good fastness to fulling and to light is also obtained if, in this example, the 1-amino-2-p-tert.-amylphenoxy-4-p-phenoxy-anilidoanthraquinone is replaced by an equivalent quantity of 1-amino-2-p-tert.-amylphenoxy-4-p-phenyl-anilidoanthraquinone, while otherwise proceeding as described in the said example.

Further examples of dyestuffs which can be prepared in analogous manner according to the present invention are set forth in the following table:

| Example No. | Dyestuff Base | Dyeing of Sulfonated Product on Wool |
|---|---|---|
| 11 | C-benzoyl-2-p-sec.-amylphenoxy-4-anilido-anthrapyridone | red. |
| 12 | C-benzoyl-2-p-iso-octylphenoxy-4-anilido-anthrapyridone | Do. |
| 13 | C-benzoyl-2-p-phenoxy-4-p-toluido-anthrapyridone | bluish red. |
| 14 | C-benzoyl-2-p-cresoxy-4-p-toluido-anthrapyridone | Do. |
| 15 | C-benzoyl-2-m-cresoxy-4-p-toluido-anthrapyridone | red. |
| 16 | C-benzoyl-2-(2', 3', 5'-trimethyl)-phenoxy-4-mesidino-anthrapyridone. | yellow-red. |
| 17 | C-benzoyl-2-p-cyclohexylphenoxy-4-mesidino-anthrapyridone | Do. |
| 18 | C-benzoyl-2-p-sec.-amylphenoxy-4-mesidino-anthrapyridone | Do. |
| 19 | C-benzoyl-2-m-ethylphenoxy-4-mesidino-anthrapyridone | Do. |
| 20 | C-benzoyl-2-p-tert.-butylphenoxy-4-mesidino-anthrapyridone | Do. |
| 21 | C-benzoyl-2-p-tert.-butylphenoxy-4-m-chloranilido-anthrapyridone | yellowish red. |
| 22 | C-benzoyl-2-phenoxy-4-p-chlor-anilido-anthrapyridone | red. |
| 23 | C-benzoyl-2-p-tert.-butylphenoxy-4-p-chloranilido-anthrapyridone | Do. |

| Example No. | Dyestuff Base | Dyeing of Sulfonated Product on Wool |
|---|---|---|
| 24 | C-benzoyl-2-p-iso-octylphenoxy-4-p-chloranilido-anthrapyridone. Formula of the sulfonated dyestuff: [structure shown] | yellowish red. |
| 25 | C-benzoyl-2-p-tert.-amylphenoxy-4-isoduridino-anthrapyridone | yellow-red. |
| 26 | C-benzoyl-2-p-tert.-amylphenoxy-4-m-xylidino-anthrapyridone | blue-red. |
| 27 | C-benzoyl-2-p-sec.-amylphenoxy-4-m-xylidino-anthrapyridone | Do. |
| 28 | C-benzoyl-2-p-tert.-amylphenoxy-4-(6'-bromo)-m-xylidino-anthrapyridone. | yellowish red. |
| 29 | C-benzoyl-2-p-tert.-amylphenoxy-4-vic.-m-xylidino-anthrapyridone | yellow-red. |
| 30 | C-benzoyl-2-phenoxy-4-(p-phenyl)-anilido-anthrapyridone | red-violet. |
| 31 | C-benzoyl-2-p-iso-octylphenoxy-4-(p-phenyl)-anilido-anthrapyridone | Do. |
| 32 | C-benzoyl-2-p-tert.-butylphenoxy-4-(p-phenoxy)-anilido-anthrapyridone. | Do. |
| 33 | C-benzoyl-2-p-tert.-amylphenoxy-4-(5',6',7',8'-tetrahydro-1')-naphthyl-amino-anthrapyridone. | violet-red. |
| 34 | C-benzoyl-2-p-tert.-amylphenoxy-4-(5',6',7',8'-tetrahydro-2')-naphthyl-amino-anthrapyridone. | Do. |
| 35 | C-(2'-chloro)-benzoyl-2-p-tert.-amyl-phenoxy-4-anilido-anthrapyridone. Formula of the dyestuff: [structure shown] | red. |
| 36 | C-(2'-nitro)-benzoyl-2-p-tert.-amyl-phenoxy-4-anilido-anthrapyridone | Do. |
| 37 | C-(4'nitro-3'-methyl)-benzoyl-2-p-cresoxy-4-anilido-anthrapyridone | Do. |
| 38 | C-(3'-chloro)-benzoyl-2-p-cresoxy-4-p-toluido-anthrapyridone | blue-red |
| 39 | C-(4'-chloro)-benzoyl-2-p-tert.-amyl-phenoxy-4-mesidino-anthrapyridone. | yellow-red. |
| 40 | C-(4'-methoxy)-benzoyl-2-p-tert.-butyl-phenoxy-4-anilido-anthrapyridone. | red. |
| 41 | C-(4'-bromo)-benzoyl-2-p-cresoxy-4-anilido-anthrapyridone | Do. |
| 42 | C-(3'-nitro)-benzoyl-2-p-cresoxy-4-p-toluido-anthrapyridone | blue-red. |

The dyestuffs according to the present invention are easily soluble in water.

The treatment of the unsulfonated dyestuff bases with sulfonating agents yields first of all dyestuffs which possess only a little solubility in water and therefore are considered as to be the monosulfonated products. This sulfonation step is to be passed by a further treatment; easily soluble products are then obtained, from the behaviour of which and the increase of the weight it must be concluded that they are disulfonated products.

The formulae of the dyestuffs in this application are given with two sulfonic acid groups, though it is not quite certain where these groups have entered in the molecule. It is however probable that they are attached to the aryloxy and to the arylamino groups respectively. Nevertheless it is possible that the integer 2 is an average and that besides the disulfonated dyestuffs there may exist small amounts of the mono- and the trisulfonated ones. It is even possible that the average sum of the sulfonic acid groups in the dyestuffs is a little less or more than two.

*Example 43*

Dyeing with a representative dyestuff according to the present invention may be carried out, for example as follows:

2 parts of the dyestuff in standard form are dissolved in 800 parts of water of 80° C. The solution is poured into 9200 parts of water of 40–50° C.; 10 parts of Glauber's salt and 2 parts of acetic acid are added.

Then 100 parts of wool are entered in the dyebath. The latter is heated to the boil and boiled for half an hour. After cooling the bath to 40° C., 2 parts of acetic acid are anew added, and the dyebath is kept at the boil for another half an hour.

After this operation the dyed wool is rinsed with water and dried.

Having thus disclosed the invention, what is claimed is:

1. A dyestuff of the anthrapyridone series corresponding to the formula

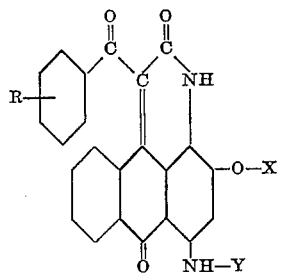

wherein X stands for a member selected from the class consisting of phenyl, alkylphenyl and cycloalkylphenyl groups, Y stands for a member selected from the group consisting of phenyl, alkylphenyl, phenoxyphenyl, chlorophenyl, bromophenyl, diphenyl and tetrahydronaphthyl radicals, and R is a member selected from the class consisting of H, CH₃, Cl, Br, OCH₃ and nitro.

2. The dyestuff corresponding to the formula

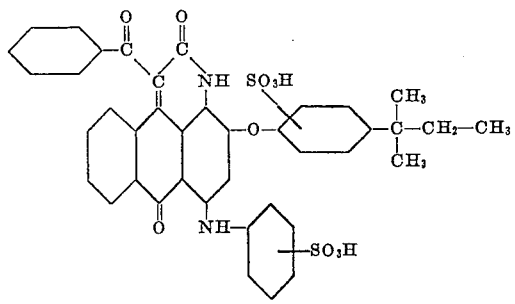

3. The dyestuff corresponding to the formula

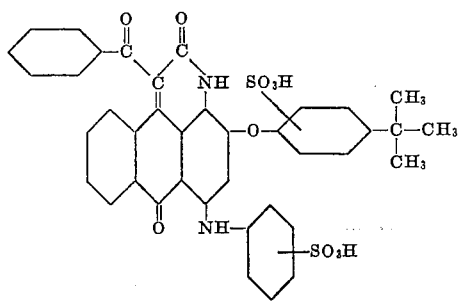

4. The dyestuff corresponding to the formula

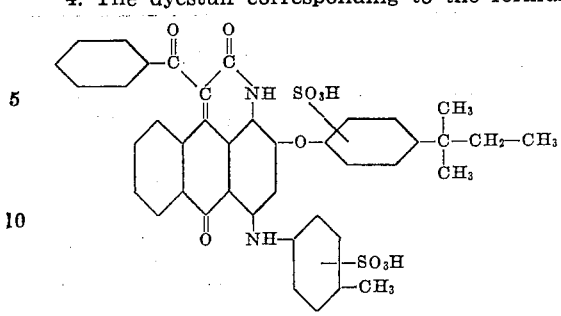

5. The dyestuff corresponding to the formula

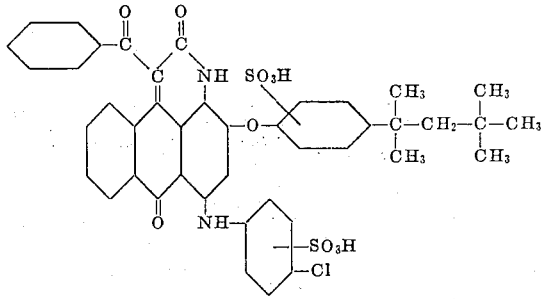

6. The dyestuff corresponding to the formula

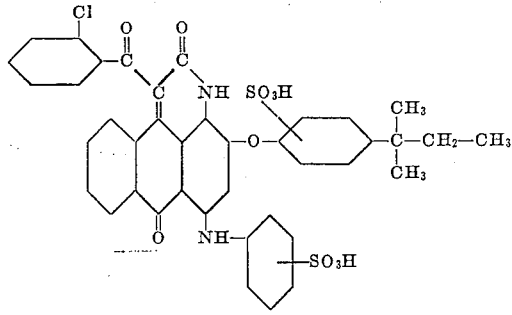

ALBIN PETER.
JACQUES GÜNTHART.

References Cited in the file of this patent

UNITED STATES PATENTS

| Number | Name | Date |
|---|---|---|
| 1,891,317 | Peter | Dec. 20, 1932 |
| 1,912,301 | Peter | May 30, 1933 |
| 2,268,814 | Frame | Jan. 6, 1942 |